United States Patent
Broadbent et al.

(10) Patent No.: US 9,652,202 B2
(45) Date of Patent: May 16, 2017

(54) VISUALIZATIONS CREATED IN DECLARATIVE VISUALIZATION LANGUAGES

(71) Applicant: International Business Machines Corporation, Armonk, NY (US)

(72) Inventors: Peter R. Broadbent, Bristol (GB); Ramon L. H. Pisters, Weert (NL); Antonius G. P. Steijvers, Ell (NL); Franciscus J. J. van Ham, Geldrop (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/829,762

(22) Filed: Aug. 19, 2015

(65) Prior Publication Data

US 2016/0110167 A1 Apr. 21, 2016

(30) Foreign Application Priority Data

Oct. 21, 2014 (GB) .................................. 1418714.0

(51) Int. Cl.
*G06F 9/44* (2006.01)
*G06F 9/45* (2006.01)
*G06F 11/36* (2006.01)
*G06T 11/00* (2006.01)

(52) U.S. Cl.
CPC .................. *G06F 8/31* (2013.01); *G06F 8/43* (2013.01); *G06F 8/436* (2013.01); *G06F 11/362* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 7,386,835 B1* | 6/2008 | Desai | G06F 8/38 715/760 |
| 7,463,263 B2 | 12/2008 | Gilboa | |
| 7,880,749 B2 | 2/2011 | Favart et al. | |
| 8,196,047 B2 | 6/2012 | Fisher et al. | |
| 8,531,451 B2 | 9/2013 | Mital et al. | |
| 9,378,562 B1* | 6/2016 | Ciolfi | G06T 11/00 |
| 2003/0131284 A1* | 7/2003 | Flanagan | G06F 8/75 714/38.1 |

(Continued)

OTHER PUBLICATIONS

Dictionary definition for "Violation", Merriam-Webster Dictionary, Nov. 22, 2013.*

(Continued)

*Primary Examiner* — Daxin Wu
(74) *Attorney, Agent, or Firm* — Daniel C. Housley (57) ABSTRACT

A declarative specification for visualization may be improved. The declarative specification for the visualization may be identified and checked for appropriateness. This appropriateness check can be done by ensuring that the declarative specification meets a number of rules. The rules may be predefined and include rules that define best practices for visualizations. If a portion of the declarative specification violates one of the rules, it can be highlighted. In this way, the user can see how the declarative specification can be improved for visualization.

5 Claims, 6 Drawing Sheets

(56) References Cited

U.S. PATENT DOCUMENTS

| | | | |
|---|---|---|---|
| 2008/0010597 A1* | 1/2008 | Seemann | G06T 11/00 715/723 |
| 2008/0244416 A1 | 10/2008 | Dumant et al. | |
| 2009/0322755 A1 | 12/2009 | Holm-Peterson et al. | |
| 2009/0326921 A1* | 12/2009 | Robertson | G06F 8/34 704/9 |
| 2012/0218254 A1 | 8/2012 | Abeln | |
| 2014/0067836 A1 | 3/2014 | Holmes et al. | |
| 2014/0125672 A1 | 5/2014 | Winternitz et al. | |
| 2015/0145883 A1* | 5/2015 | Marti | G09G 3/20 345/592 |
| 2015/0268948 A1* | 9/2015 | Plate | G06F 8/71 717/123 |
| 2016/0110895 A1 | 4/2016 | Broadbent et al. | |

OTHER PUBLICATIONS

Heer et al., "Declarative Language Design for Interactive Visualization", Computer Science Department of Stanford University, Stanford, CA, posted online Oct. 24, 2010, 8 pages.

Unknown, "Vega: A Visualization Grammar", GitHub, © 2015 GitHub, Inc., pp. 1-2. Printed on Jun. 29, 2015. https://github.com/trifacta/vega.

Unknown, "Rave", Rave, pp. 1-2. Printed on Jun. 29, 2015. http://vottrave.ottawa.ibm.com/.

Wilkinson, L., "The Grammar of Graphics", Springer; 2nd edition (Jul. 15, 2005), Chapter 19, pp. 611-622.

GB Application 1418714.0, entitled "Improving Visualizations Created in Declarative Visualization Languages", filed Oct. 21, 2014, 20 pages.

Fekete et al., "Obvious: A meta-toolkit to encapsulate information visualization toolkits—One toolkit to bind them all", 2011 IEEE Conference on Visual Analytics Science and Technology (VAST), Oct. 23-28, 2011, pp. 91-100. DOI: 10.1109/VAST.2011.6102446.

Jafri et al., "A Survey of Face Recognition Techniques", Journal of Information Processing Systems, vol. 5, No. 2, Jun. 2009, pp. 41-68. Copyright © 2009 KIPS. DOI : 10.3745/JIPS.2009.5.2.041.

Unknown, "Protovis: A Graphical Approach to Visualization", Copyright 2010 Stanford Visualization Group, 1 page. http://mbostock.github.io/protovis/.

Weaver, C., "Building Highly-Coordinated Visualizations in Improvise", In Proceedings of the IEEE Symposium on Information Visualization (INFOVIS '04). IEEE Computer Society, Washington, DC, USA, pp. 159-166. DOI: 10.1109/INFOVIS.2004.12. http://dx.doi.org/10.1109/INFOVIS.2004.12.

Unknown, "Declarative Language", Dictionary.com, © 2016 Dictionary.com, LLC., 3 pages. Printed on Oct. 27, 2016. http://www.dictionary.com/browse/declarative-language.

GB Application 1418715.7, entitled "Generating a Computer Executable Chart Visualization by Annotating a Static Image of Said Visualization", filed on Oct. 21, 2014, 27 pages.

List of IBM Patents or Patent Applications Treated as Related, dated Oct. 26, 2016, pp. 1-2.

* cited by examiner

VISUALIZATIONS CREATED IN DECLARATIVE VISUALIZATION LANGUAGES

BACKGROUND

The present invention relates to identifying violations of predefined rules within a visualization editing and rendering system to a declarative specification for a visualization, and more particularly to suggesting improvements in line with best practice to a declarative specification for a visualization.

Domain specific declarative languages for information visualization allow a user to specify a visualization by describing what the visualization looks like, instead of describing how to render the visualization to a screen. Such rendering of the visualization is typically described in computer code. Although these languages are expressive enough to describe a wide variety of visual mappings and styling, they don't always enforce good practice when it comes to designing visualizations. Common mistakes include the use of low contrast foreground and background colors, misuse of color such as coloring each bar in a bar chart separately, and not including legends.

SUMMARY

Embodiments of the present disclosure may be directed toward a method for improving a declarative specification for a visualization. A declarative specification for visualization can be identified and, responsive to the identifying, the appropriateness of the declarative specification can be checked by ensuring the declarative specification meets a number of predefined rules defining best practice for visualizations. A language construct in the declarative specification which violates one or the predefined rules can be identified, and responsive to the checking and identifying a language construct in the declarative specification which violates one of the predefined rules, the identified violation can be highlighted in context.

Embodiments of the present disclosure may be directed toward a system for improving declarative specification for a visualization. The system may comprise a best practices database with one or more predefined best practice rules defining best practice for visualizations. The system may also comprise one or more processor circuits configured to execute program code for a rules based engine. The engine may check the appropriateness of the declarative specification by ensuring the declarative specification meets one or more of the predefined best practices rules accessed from the best practices database, responsive to the identifying of the declarative specification in the visualization specification editing system. The circuit may be configured to identify a language construct in the declarative specification which violates one of the said predefined best practice rules, and mark the identified violation in context by highlighting the violation within the specification.

Embodiments of the present disclosure may be directed toward a computer program product for improving a declarative specification for a visualization. The computer program product may comprise a computer readable storage medium with a computer readable program code embodied therewith. The computer readable program code may be adapted to perform the following steps when run on a computer including identifying a declarative specification for a visualization, and checking the appropriateness of the declarative specification by ensuring the declarative specification meets a number of predefined rules defining best practice for visualizations. A language construct in the declarative specification which violates one of the said predefined rules may also be identified, and in response to the checking and identifying, the identified violation may be highlighted in context.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Analogous to declarative languages, word processing programs allow a user to write sentences that might be syntactically or grammatically incorrect. However, many modern word processing programs can check whether what the user has currently typed is grammatically correct and highlight potential errors in the user interface.

Embodiments of the invention provide a method of improving a declarative specification for a visualization, the method comprising the steps of: providing a declarative specification for a visualization; responsive to a user providing or editing said declarative specification, checking the appropriateness of the declarative specification by ensuring the declarative specification meets a number of predefined rules defining best practice for visualizations; and responsive to said step of checking, and to identifying a language construct in the declarative specification which violates one of said predefined rules, highlighting the identified violation in context. The embodiments provide the advantage of providing a user with hints as to how to improve the visual appearance of visualizations as well as to assist the user with conforming to best practice rules, visual design guidelines and avoiding common errors.

In an embodiment, the method further comprises the step of providing recommendations for alleviating the violation based on the current specification. This has the advantage of not just telling the user of the problem which causes violation of the predefined best practice rules, but also providing one or more solutions to the problem.

In an embodiment, the identified violation is highlighted in context within the resulting visualization of the declarative specification for a visualization. Thus, the user can see not just the violation in the specification, but also the effect of the violation on the resulting visualization.

In an embodiment, said predefined rules comprise rules concerning the correct use of color, such rules comprising one or more of rules as to contrast, color coding, accessibility and choice of colors to improve legibility for color blind persons.

In an embodiment, said predefined rules comprise rules concerning appropriate visual mapping for data, such rules comprising one or more of not using pie charts for more than twenty slices, not applying too many concurrent visual mappings at once, and not using line charts for categorical data.

In an embodiment, said predefined rules comprise rules concerning appropriate visual styling, such rules comprising one or more of subtle backgrounds and grid lines, font sizes and overlapping visual elements.

Embodiments of the invention also provide a system for improving a declarative specification for a visualization, the system comprising: a declarative specification for a visualization; a best practices database comprising one or more predefined best practice rules defining best practice for visualizations; a rules based engine which, responsive to a user providing or editing said declarative specification in the visualization specification editing system, checks the appropriateness of the declarative specification by ensuring the declarative specification meets one or more of the predefined best practice rules and identifies a language construct in the declarative specification which violates one of said predefined best practice rules; and hints, which identify by highlighting the identified violation in context within the specification.

Embodiments of the invention also provide a computer program product for improving a declarative specification for a visualization, the computer program product comprising: a computer readable storage medium having computer readable program code embodied therewith, the computer readable program code adapted to perform the method described above when said program is run on a computer.

Figure 1:
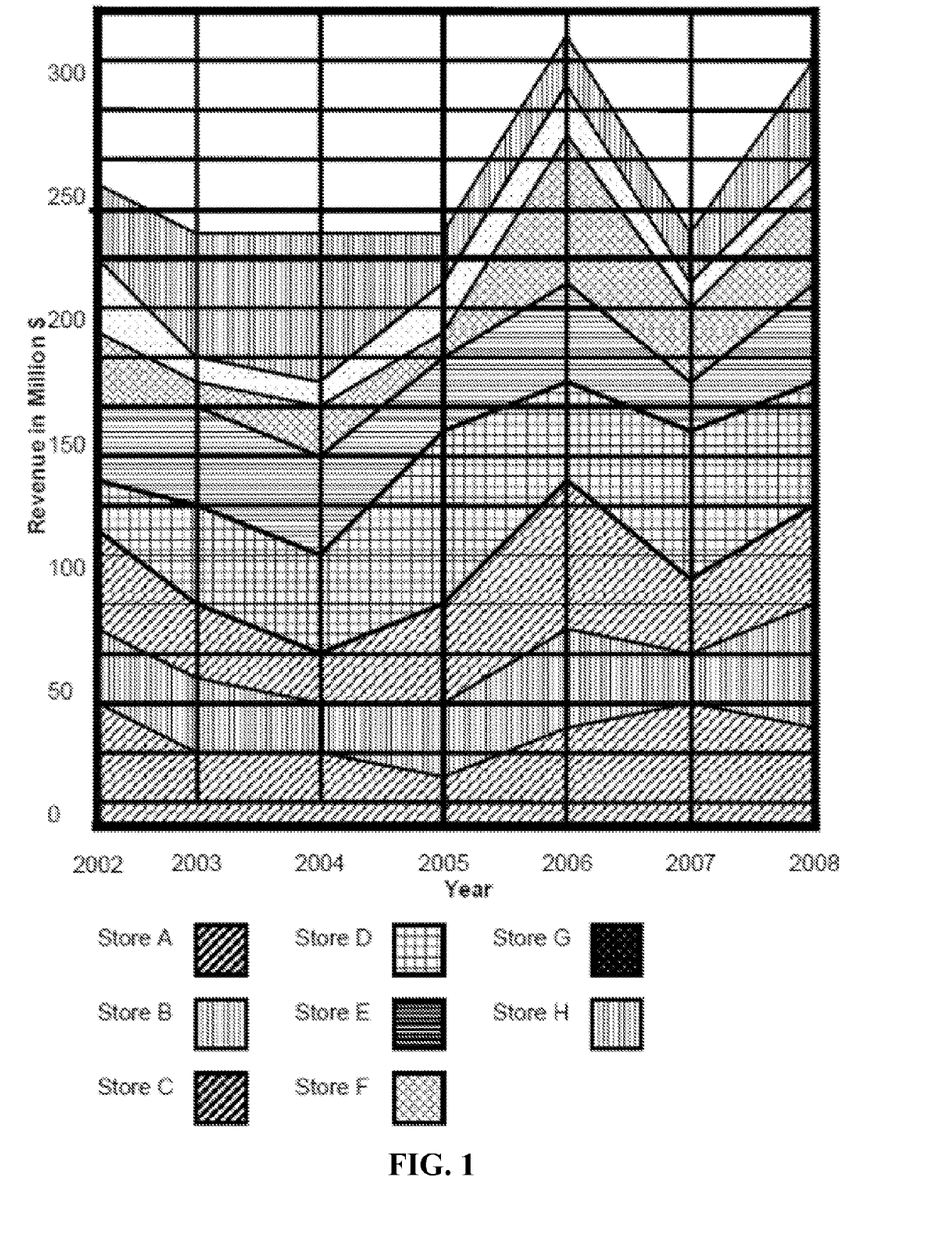
FIG. 1 shows an example visualization having a declarative specification that does not meet best practice.

FIG. 1 shows an example visualization having a declarative specification that does not meet best practice. The example visualization shows the revenues in millions of dollars from eight stores for the period 2002 to 2008. The area of the chart associated with each store is shown in different hatching in black and white. Typically, these would, in practice, be in different colors, the example visualization having areas with too low a contrast between them. In the example, the grid lines are too prominent. This is because the contrast between the thick black lines of the grid lines and the white background color is very high. In a typical example, this might be a use of a color for the grid line that results in a high contrast between the grid line and the background color. Best practice is that grid lines should be subtle and not draw too much visual attention.

Other best practice guidance may include the correct use of color. This includes selection of the best contrast of colors between different series in the chart or the correct color coding to use. Additionally, accessibility for those with poor eyesight or people who are color blind give rise to best practice which should be followed. Further best practice may include the use of appropriate visual styling. The intention of a chart is that the user sees the data in the chart represented in a graphical manner. Backgrounds and grid lines are included to allow the user to examine the data in further detail and so should be subtle so as to allow a user inspecting the chart closely to see them, but should not distract from the chart data itself.

Figure 2:
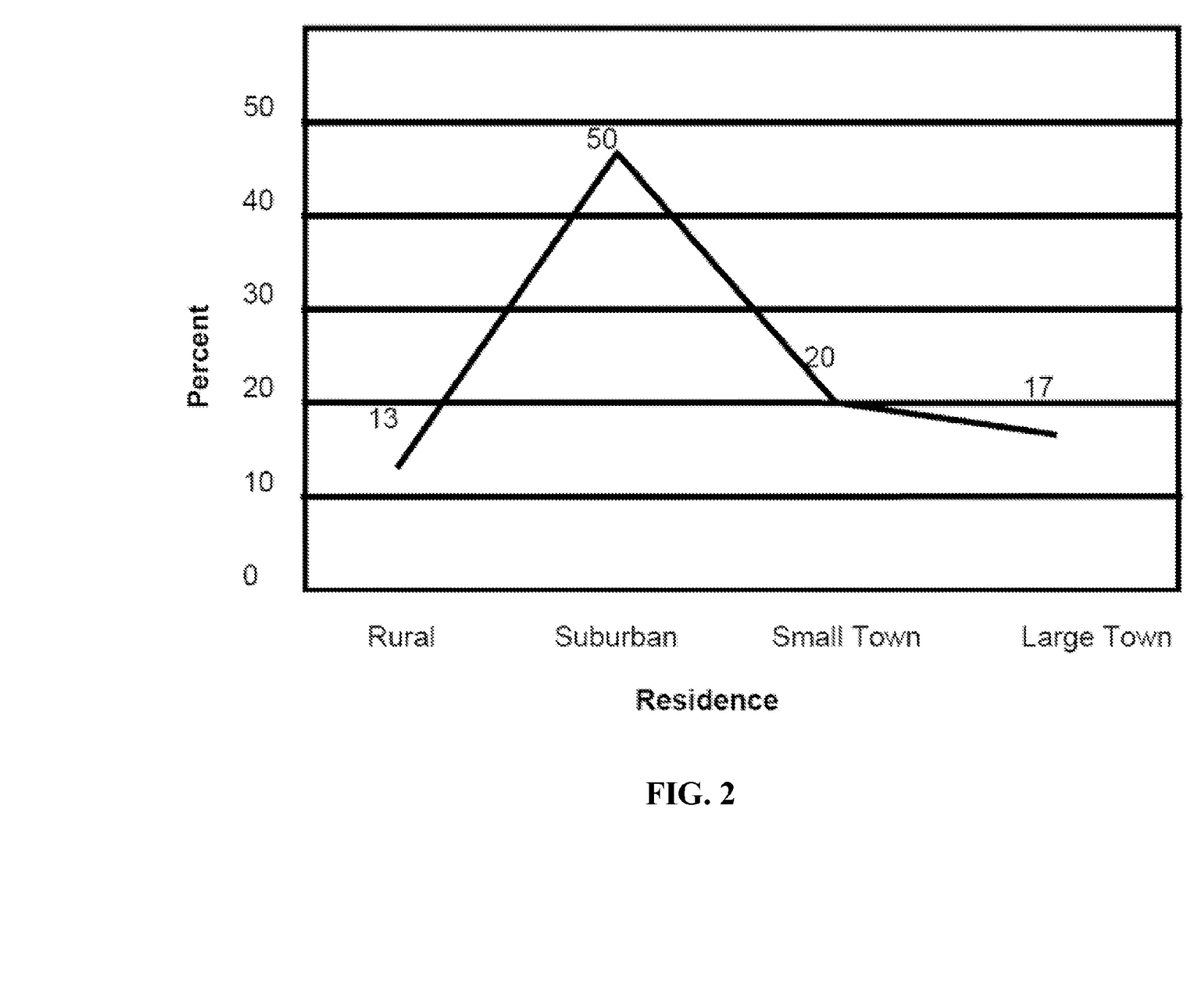
FIG. 2 shows an example visualization of an inappropriate visual mapping using a line chart for categorical data.

FIG. 2 shows an example visualization of an inappropriate visual mapping using a line chart for categorical data. The data represents where employees of a company reside. The employees may reside in rural areas, suburban areas, small towns or large towns, which are the categories. These are shown in FIG. 2 as a line chart. The data itself consists only of four discrete data points, one for each category. The use of a line chart is misleading and against best practice. This is because use of a line chart implies that this is continuous data and that there is intermediate data or that there is a trend between the data points. There is nothing technically incorrect with the chart of FIG. 2, nor anything syntactically wrong with any declarative description used to describe it, but it violates predefined best practice rules.

Figure 3:
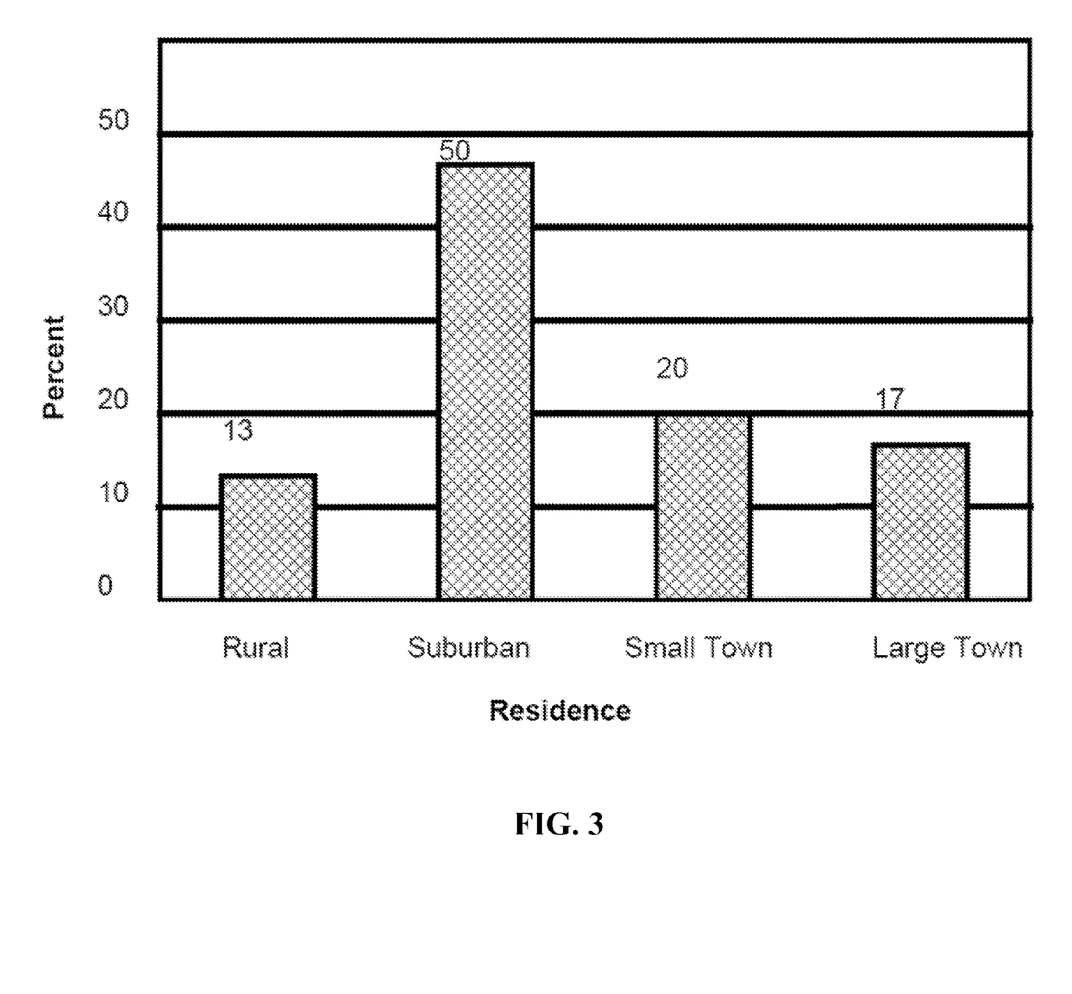
FIG. 3 shows an example visualization of an appropriate visual mapping using a bar chart for categorical data.

FIG. 3 shows an example visualization of an appropriate visual mapping using a bar chart for categorical data. The data represented is the same data as was represented in FIG. 2, that is it consists only of four discrete data points, one for each category. The use of a bar chart is best practice. This is because use of a bar chart clearly shows that there are four categories into which the employee's residence may fall. It is clear that there is no intermediate data or that there is no trend between the data points. The chart of FIG. 3 is no more or less technically correct than the chart of FIG. 2, nor is any declarative description used to describe it any more or less syntactically correct. The chart of FIG. 3 is just in line with best practice, whilst the chart of FIG. 2 is not.

Figure 4:
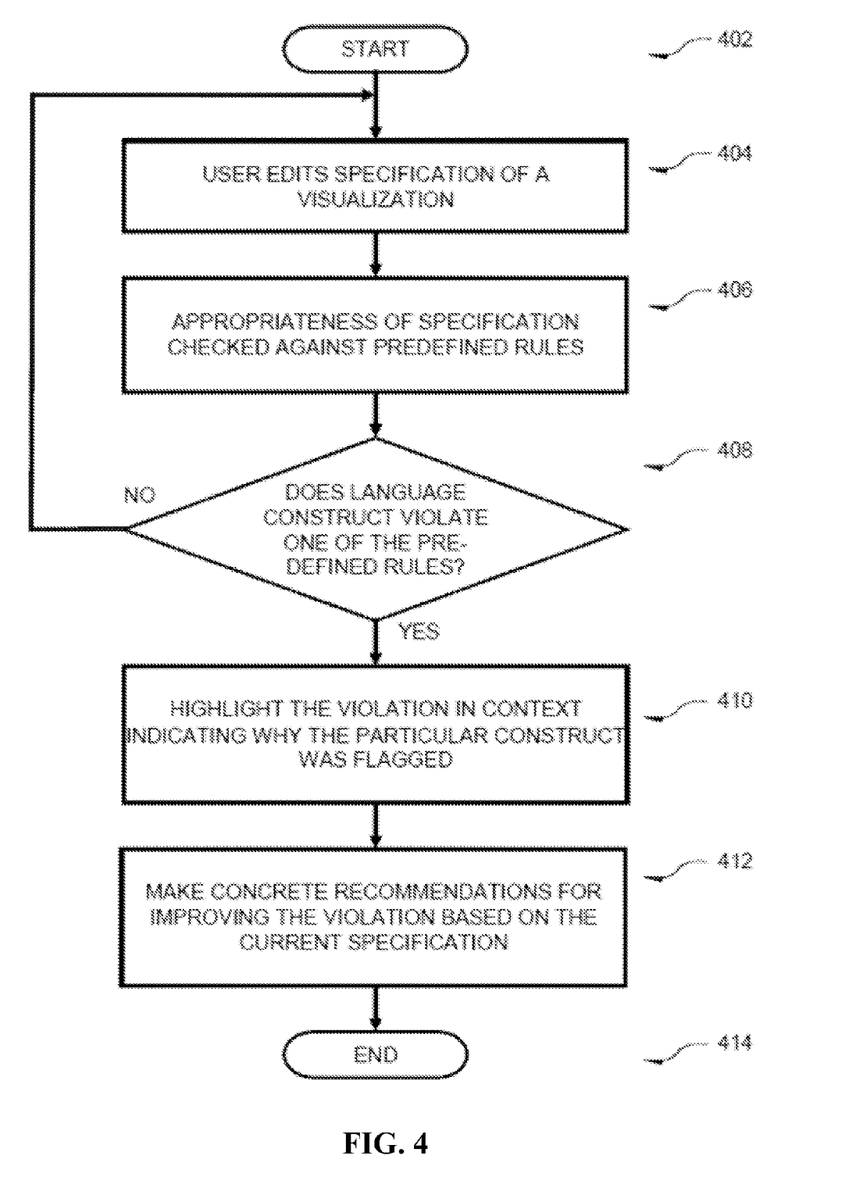
FIG. 4 shows a flow chart of an embodiment of the present invention.

FIG. 4 shows a flow chart of an embodiment of a method according to the present invention. The method starts at step 402. At step 404, a user edits the declarative specification of a visualization, such as the visualizations of FIGS. 1 to 3. At step 406, the appropriateness of the declarative specification is checked against predefined rules. The predefined rules may be, for example a set of corporate rules, a set of rules provided by the editing and rendering program, or by a user. Step 406 is carried out as a user edits the specification of the visualization, that is steps 404 to 408 are continuously repeated. In another embodiment, steps 404 to 408 are carried out once when a user has completed editing the specification.

Typically, such rules are best practice rules. In an embodiment, such rules may include rules guiding the user on the correct use of color, such as contrast, color coding, or accessibility (e.g., colorblindness). The example of FIG. 1 shows a breach of the best practice of the correct use of contrast. In another embodiment, such rules may include guiding the user on using an appropriate visual mapping for their data. Inappropriate visual mappings may include using pie charts for more than twenty slices, applying too many concurrent visual mappings at once, and the example of FIG. 2 of using line charts for categorical data. In another embodiment, such rules may include guiding the user on appropriate visual styling, such as subtle backgrounds and grid lines, font sizes, or overlapping visual elements. The example of FIG. 1 shows a breach of the rule on using subtle grid lines. Any or all of the above rules may be incorporated into an embodiment. Other rules which the person skilled in the art will be aware of may be incorporated into an embodiment.

At step 408, a check is made as to whether the language construct violates one of the predefined rules. The check is not for syntactic or semantic correctness, which ensures that the user is supplying the specification in a form such that a computer system can parse it. The check is for whether the visualization produced by the specification will be compliant with best practice predefined rules. Optionally, the check may also be for compliance with visual design guidelines or for common errors. If the language construct does not violates one of the predefined rules, then processing returns to step 404. If the language construct violates one of the predefined rules, then processing proceeds to step 410.

At step 410, the violation of the predefined rule is highlighted in the context of the surrounding specification indicating why the particular language construct was highlighted. Highlighting may take any form that indicates to the user that this language construct is the one which violates the predefined rule. In an embodiment, the highlighting may be by using a different color, font, type size, bold, italic, underline, or any combination of these or other highlighting. In another embodiment, the highlighting may be by additionally displaying the language construct in a separate window together with the text explaining why the particular language construct was highlighted.

Figure 5:
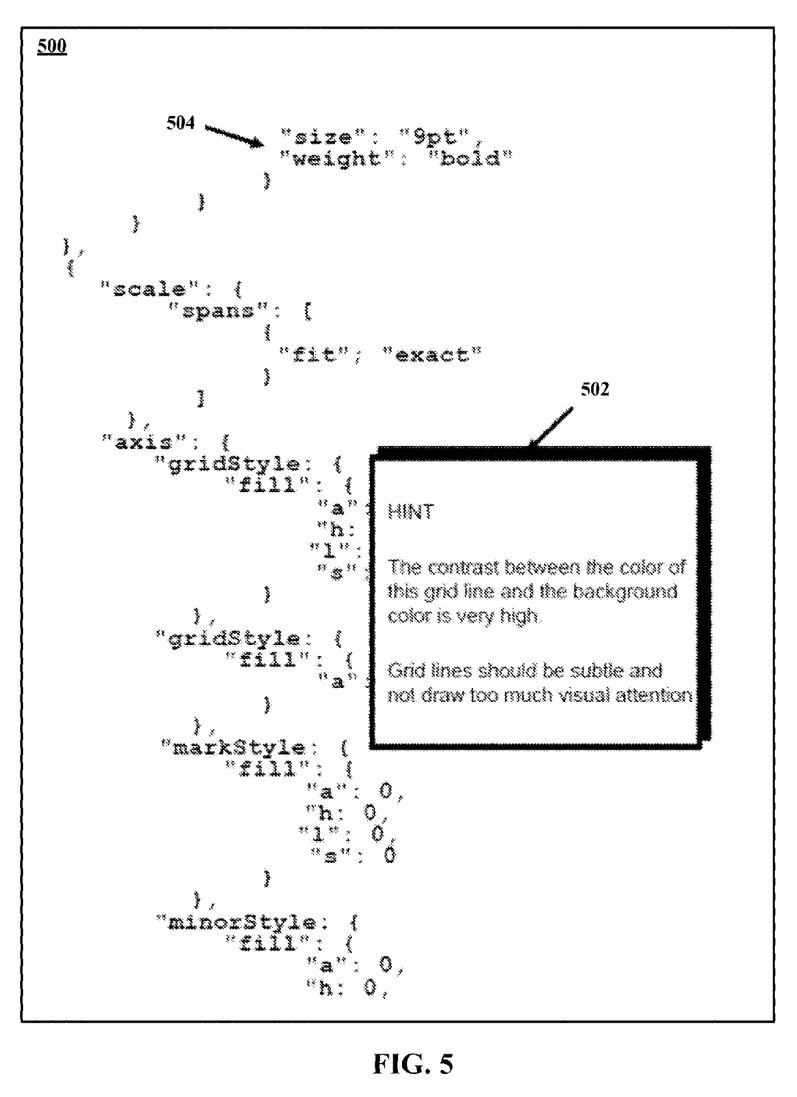
FIG. 5 shows a visualization specification with the identified violation highlighted.

Referring to FIG. 5, the indication as to why the particular language construct was highlighted may be text displayed in a box 502 with a different color text or background or both. FIG. 5 shows an example screenshot 500 of a specification 504 with the box 502 displayed. The "gridStyle" portion of the specification 504 defines the style of the grid lines. This portion of the specification 504 violates the best practice predefined rules. The check at step 408 (of FIG. 4) indicated that the gridStyle language construct violated one of the predefined rules. At step 410 (of FIG. 4), the gridStyle portion of the specification 504 was highlighted by the use of the text in a box 502 shown in the context of the portion of the specification 504 which violates the predefined rule. In FIG. 5, the box 502 includes text indicating that it is a hint and that the reason for the violation is "The contrast between the color of this grid line and the background color is very high". It also includes optional text explaining why the portion of the text is a violation of the predefined rule. In FIG. 5, this optional text is "Grid lines should be subtle and not draw too much visual attention".

Returning to FIG. 4, at step 412, the embodiment of the method of the present invention optionally makes one or more concrete recommendations for improving the portion of the specification responsible for the violation of the predefined rules or for alleviating the violation. It does this taking into account the specification as a whole. In the example shown in FIG. 5, where the violation is that the contrast between the color of the grid line and the background color is too high, it will typically identify more appropriate values for the color of the grid line. However, it may also suggest a different background color that may be used in order to reduce the contrast. In an example specification editor, a rendered visual representation of the output of the specification is available to a user, either displayed on the screen at the same time as the specification being edited or available by clicking a mouse, pressing a button or selecting from a menu. In this way, the user can see violations of the predefined rules and suggestions for improvement in the context of both the editor and the visual representation. The method ends at step 414 (of FIG. 4). In embodiments of the invention, a user will continue to edit the specification and so the method will restart at step 402 (of FIG. 4), and check the next edit made by the user against the predefined rules at step 406 (of FIG. 4) and continue as described above until step 414 (of FIG. 4) is reached.

Figure 6:
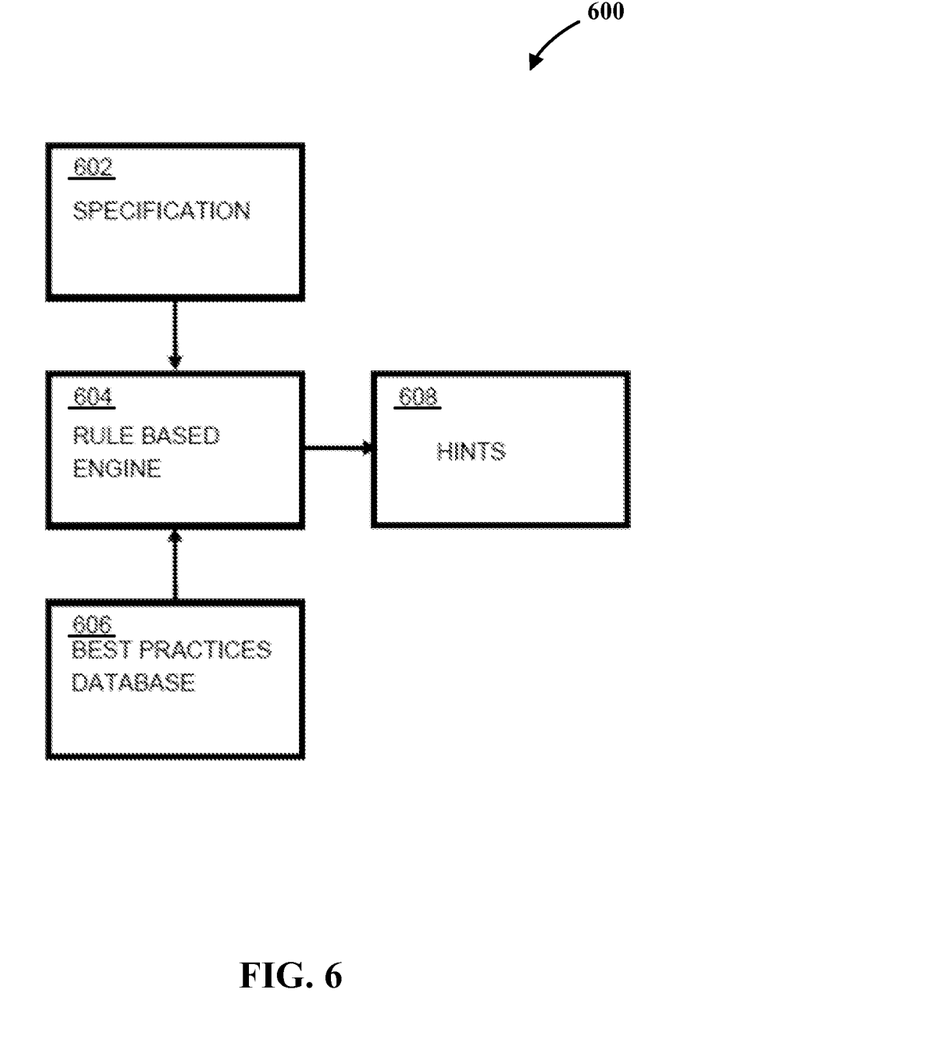
FIG. 6 shows a system of an embodiment of the present invention.

FIG. 6 shows a system 600 of an embodiment of the present invention. The system 600 comprises the specification 602, a rule based engine 604, best practices database 606 and hints 608. The specification is the input specification that the user edits at step 404 (in FIG. 4). The rule based engine 604 checks the appropriateness of the specification 602 against the predefined rules contained in the best practices database 606. If the rule based engine 604 determines that the specification 602 violates one of the predefined rules in the best practices database 606, then it produces a hint 608 that indicates to the user the portion of the specification 600 that violates the predefined rule and also indicates why the particular language construct in the specification 606 was highlighted. Optionally, the hint 608 may contain concrete recommendations for improving the specification 606 so as to remove the violation of the predefined rules.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of improving a declarative specification for a visualization, the method comprising the steps of:
    identifying a declarative specification for a visualization;
    checking, responsive to the identifying said declarative specification, an appropriateness of the declarative specification by ensuring the declarative specification meets a number of predefined rules defining best practice for visualizations;
    identifying a violation, the violation being a language construct in the declarative specification which violates one of said predefined rules;
    responsive to said checking and to said identifying the language construct in the declarative specification which violates one of said predefined rules, highlighting the violation in context, wherein the language construct which violates one of said predefined rules is highlighted in context within a resulting visualization of the declarative specification; and
    displaying, to a user, a window in the foreground of the declarative specification for a visualization, the window containing a hint, the hint providing a recommendation that, when implemented, results in the visualization complying with the at least one violated predefined rule, the hint further providing the at least one violated predefined rule.

2. The method of claim 1, further comprising the step of providing recommendations for alleviating the violation based on the declarative specification.

3. The method of claim 1, wherein said predefined rules comprise rules concerning a correct use of color, such rules comprising one or more of rules as to contrast, color coding, accessibility, and choice of colors to improve legibility for color blind persons.

4. The method of claim 1, wherein said predefined rules comprise rules concerning inappropriate visual mapping for data, such rules comprising one or more of using pie charts for more than twenty slices, applying too many concurrent visual mappings at once, and using line charts for categorical data.

5. The method of claim 1, wherein said predefined rules comprise rules concerning appropriate visual styling, such rules comprising one or more of subtle backgrounds and grid lines, font sizes, and overlapping visual elements.

* * * * *